Patented Apr. 18, 1933

1,903,809

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

METHOD OF MAKING PHENOL-FORMALDEHYDE RESINS CONTAINING AN ALKALINE EARTH METAL BASE

No Drawing. Application filed June 1, 1923, Serial No. 642,868. Renewed April 2, 1930.

This invention relates to a process of making molding composition containing a binder formed from an aldehyde, particularly formaldehyde, a phenolic substance, particularly phenol, and an alkaline earth metal base particularly a basic compound of barium. The composition is especially adapted for hot molding purposes.

The invention revolves about the formation of aqueous solutions of the binding agent which solution may be used for impregnating fillers customarily employed as extending agents in the plastic industry.

The usual method of mixing the binder and filler is to employ alcohol or other organic solvent which results in a considerable number of operations, loss of solvent etc. Sometimes heavy milling rolls such as are used in rubber manufacture are employed, calling for large power requirements.

In the present invention the preferred object is to use aqueous formaldehyde preferably the commercial grade which contains about 40 per cent of actual aldehyde and to avail of the water present in such formaldehyde to obtain a solution conveniently adapted for impregnating or mixing with the filler in a simple and adequate manner.

The operations by my process are reduced to three essential ones, to wit:

1. Allowing phenol, aqueous formaldehyde and a basic barium compound such as barium oxide or hydroxide to react together.

2. Mixing the solution thus obtained with a filler and if desired suitable coloring matter.

3. Drying the mixture to remove moisture.

The product is then ready for molding by hot pressing (although if lumpy it may first be ground).

The preparation of molding composition is thus reduced to very simple steps and the operation therefore may be carried out with rapidity and at a low cost for labor.

Molding compositions containing phenol formaldehyde resin usually are prepared with ammonia as a base or hexamethylenetetramine is employed. Troubles not infrequently arise from blistering, especially when attempting to shorten the time of molding by running the press relatively hot and removing the molded article from the mold without first chilling. Sticking to and staining of the molds also occurs in some cases. Stearic acid has been generally used as a mold lubricant and it has a tendency to corrode the mold surface in the course of time. Free phenol is a cause of staining of the mold and the use of hexamethylenetetramine in a free state in the molding composition to react with uncombined phenol does not entirely avoid staining difficulties.

An object of the present invention is to avoid the employment of a binder containing ammonia in order that molding may be carried out at relatively high temperatures without blistering and thus a high output of molded articles will be obtained.

In the present invention I preferably employ a very substantial amount of basic material preferably as stated barium oxide or hydroxide. An advantage in using an alkaline earth metal base is that in case any of it remains in the finished molded article in an uncombined state or is liberated at any time the action of carbon dioxide of the air will be to form an inert carbonate which remains in the product simply as a filler.

A series of experiments conducted by the applicant discloses the fact that barium as a base (BaO) is capable of producing solutions in accordance with the present invention which serve cheaply for impregnation purposes.

The content of this base may be widely varied and still obtain such solutions capable of keeping indefinitely. Thus the content of barium oxide may range from say 1 per cent to 150 per cent or higher (calculated on the weight of the phenol) and with aqueous formaldehyde solutions of say 37 to 40 per cent strength the reaction product will be a solution appropriate for mixing with filling agents.

With a high content of barium oxide the solution is capable of dilution with water without precipitation but with low contents of barium oxide the addition of a small amount of water in the cold may cause precipitation depending on the degree of the reaction. The viscous material which separates on the addition of water frequently may be put back into solution by boiling. Impregnation of filler is best carried out with hot solutions. If through any misfortune of operation separation should occur from the aqueous solution a small amount of alcohol sometimes may be used to correct the results of such an accident.

Thus solutions may be made with even less than 1 per cent of barium oxide (calculated on the weight of the phenol) which keep indefinitely. The reaction between the barium oxide or hydroxide, phenol and formaldehyde preferably is carried out without unnecessary exposure to air in order to avoid premature carbonation of the basic barium material. If used in the form of caustic baryta it combines readily with phenol to form barium phenate and preferably I employ such a proportion of barium oxide or hydroxide as will form a substantial amount of barium phenate. In fact I am disposed to believe the main action of the formaldehyde is on the phenate rather than on the phenol and preferably have present at least one-fourth the amount of barium oxide required to combine with the phenol. Expressed in another way of the total phenol employed at least one-fourth is combined with barium as the phenate (phenolate, phenoxide or whatever term may apply to the compound formed); that is not over three parts of free phenol are present to one part of phenol combined as the barium compound.

The reaction may be carried out in a vessel equipped with a reflux condenser or a closed vessel (autoclave) may be used. However good results have been obtained by carrying out the reaction in an open vessel e. g. an ordinary laboratory flask loosely stoppered. Stirring is desirable while carrying out the operation. Preferably as indicated the reaction should not be allowed to progress to the point where the reaction product and the aqueous material separate into two layers.

As phenolic bodies I intend to employ any appropriate phenolic substance including for example meta and para cresols capable of reacting in a substantially similar manner but prefer to use ordinary phenol or carbolic acid or a mixture of phenol with some cresol.

As an aldehyde I prefer formaldehyde in its usual aqueous form but may also employ a mixture of paraform and water. The presence of other appropriate aldehydes is not excluded.

Of the alkaline earth metal bases I have in mind calcium, barium, strontium and magnesium. I look upon the barium compound of especial value for the purposes of the present invention; it forms very soluble compounds with phenol. Mixtures of alkaline earth metal bases also may be employed as for example 1 part of barium oxide or hydroxide with 1, 2, 3 or more parts of magnesium oxide or hydroxide. A mixture of calcium and magnesium oxides such as dolomitic quick lime may be used in some cases. When it is desired to keep the mineral content or ash as low as possible a considerable proportion of magnesium oxide or hydroxide may be present in place of the corresponding molecular proportion of the heavy substance barium oxide. Thus for example one-twentieth of the combining proportion of barium oxide with phenol may be employed along with four-twentieths of the combining proportion of magnesium oxide in order to have present as basic material one-fourth of the combining proportion or equivalent of phenol.

As indicated barium phenate forms readily and the compound is very soluble in water. It also apparently exerts a strong solvent effect in maintaining the incipient binding agent in aqueous solution. It is a matter of surprise to the applicant to learn that even ½ of 1 per cent of barium hydroxide (calculated on the weight of the phenol) suffices.

When equivalent proportions of phenol, namely, 94 parts by weight and barium oxide 76.5 parts by weight are employed with 40 per cent aqueous formaldehyde dark brown solutions result. With phenol 94 parts and barium oxide say 1 or 2 parts solutions may be obtained which are of a light yellow color.

A solution may be made by mixing and warming together

Phenol_____ 100 parts (by weight)
Formaldehyde (40%)_____ 100 parts
Barnium hydroxide____ 10 per cent (on weight of phenol)

The ordinary hydrated barium hydroxide is used in this case. After stirring and heating at 80–90° C. for about 2 hours the solution is ready to be mixed with a filler.

The foregoing solution contains less than the preferred amount of barium base. A solution may be prepared by mixing phenol 1 mol. with one-fourth the combining proportion of barium oxide or barium hydroxide and incorporating aqueous formaldehyde in an amount equal to the weight of the phenol taken. On heating and stirring as indicated above for a period of 2 to 3 hours the solution is ready to be admixed with a filler.

Such a binder is especially recommended for use with silicious fillers particularly those containing asbestos or mica. A difficulty has been experienced in "wetting" certain silicious fillers with phenol-formaldehyde resins containing ammonia. It is probable that the present product containing the barium base, preferably that having the base equal to or in excess of one-fourth the equivalent of phenol employed, reacts in some manner with the surface of the silicious particles or fibres especially those containing hydrated silicates or zeolites, or in some manner reduces the surface tension to secure a desirable degree of adhesion. For this purpose preferably there should be present basic material to the extent of at least one-fourth the combining proportion of the phenol. A great variety of fillers may be employed including mineral powders and organic substances and no attempt will be made to make a list of these as their application and properties is well known in the rubber and other plastic industries. Organic fillers such as saw dust, wood flour, cotton flock, corn cobs, cork flour etc. may be employed in conjunction with silicious fillers or to replace them entirely when desired.

The proportion of binder to filler may vary preferably in the case of organic fillers as for example equal parts of binder and wood flour may be employed or in some cases lower proportions as for example 2 parts of wood flour to 1 part of binder. Mineral fillers may be employed in larger proportion as for example 4 parts by weight to 1 part of binder. The filler may be mixed with the solution by agitating in a suitable mixing device. The composition may then be placed in an ordinary drying oven and dried at a gentle heat to remove moisture. It may be dried advantageously in a vacuum dryer.

Molding composition made according to the present invention may be shaped readily in a hot press at 170° C. at 1000 pounds pressure for a period of three minutes. The molded article may be immediately removed from the hot mold without formation of blisters even at this temperature.

Solutions made with 40 per cent formaldehyde in general will have a sufficient amount of water present so as to enable the filler to be thoroughly wetted and impregnated with the solution. Uniform mixing is important and if dilution is required water may be added in small amount especially with the solution kept hot. As indicated above if precipitation should occur more particularly with solutions containing a low content of base alcohol may be added in some cases to restore the solution but the expense of alcohol and presumably the reduced "wetting" effect on a silicious filler when alcohol is present renders water the most desirable solvent.

On the other hand water has a higher boiling point than alcohol, acetone and the like and in evaporating the water at the somewhat higher temperature necessary when evaporation goes on at atmospheric pressure the reaction will continue and a filler whose particles are coated or impregnated with a binder which is initially a viscous liquid may have the latter converted by the action of heat during drying into a stiffer or more solid material. For molding purposes this is often desirable as the binder does not squeeze out of the filler and out of the mold on hot pressing. This reaction may be caused to take place although to a lesser extent on vacuum drying. In some cases the drying and baking should be continued to the point where no squeezing of binder from filler occurs in the press. The use of a rotary vacuum dryer maintained at a temperature of 70–90° C. facilitates the drying step.

In same cases the ingredients forming the binder may be mixed along with the filler and the reaction conducted throughout in the presence of the filler.

What I claim is:—

The process of making molding composition which comprises reacting at a temperature of from above 80 to below 90° C. with aqueous formaldehyde on barium phenate and phenol, said phenol not exceeding three times the amount by weight of combined phenol to form a homogeneous solution of the reaction product, incorporating the solution with a filler and exposing to heat in vacuo to dry and stiffen the reaction product.

CARLETON ELLIS.